United States Patent
Torrione

(10) Patent No.: US 11,859,468 B2
(45) Date of Patent: Jan. 2, 2024

(54) SYSTEMS AND METHODS FOR ESTIMATING RIG STATE USING COMPUTER VISION

(71) Applicant: HELMERICH & PAYNE TECHNOLOGIES, LLC, Tulsa, OK (US)

(72) Inventor: Peter A Torrione, Durham, NC (US)

(73) Assignee: Helmerich & Payne Technologies, LLC, Tulsa, OK (US)

(*) Notice: Subject to any disclaimer, the term of this patent is extended or adjusted under 35 U.S.C. 154(b) by 82 days.

(21) Appl. No.: 17/208,544

(22) Filed: Mar. 22, 2021

(65) Prior Publication Data

US 2021/0209361 A1    Jul. 8, 2021

Related U.S. Application Data

(63) Continuation of application No. 14/938,523, filed on Nov. 11, 2015, now Pat. No. 10,997,412.

(60) Provisional application No. 62/078,587, filed on Nov. 12, 2014.

(51) Int. Cl.
*E21B 41/00* (2006.01)
*G06V 20/00* (2022.01)

(52) U.S. Cl.
CPC .............. *E21B 41/00* (2013.01); *G06V 20/00* (2022.01)

(58) Field of Classification Search
CPC ............................ E21B 41/00; G06K 9/00624
USPC ......................................................... 348/85
See application file for complete search history.

(56) References Cited

U.S. PATENT DOCUMENTS

| | | | |
|---|---|---|---|
| 4,610,005 | A | 9/1986 | Utasi |
| 4,794,534 | A | 12/1988 | Millheim |
| 6,469,734 | B1 | 10/2002 | Nichani et al. |
| 7,874,351 | B2 | 1/2011 | Hampton et al. |

(Continued)

FOREIGN PATENT DOCUMENTS

| | | |
|---|---|---|
| CA | 2967735 A1 | 5/2016 |
| WO | 2013048260 A2 | 4/2013 |

(Continued)

OTHER PUBLICATIONS

Canadian Patent Application No. 2,967,773, "Office Action", dated Jan. 11, 2022, 6 pages.

(Continued)

*Primary Examiner* — Jonathan R Messmore
*Assistant Examiner* — Asmamaw G Tarko
(74) *Attorney, Agent, or Firm* — Kilpatrick Townsend & Stockton

(57) ABSTRACT

The invention relates to a system and method for estimating global rig state. The system comprises a model incorporating multiple variables related to rig state, at least one camera operably connected to at least one processor wherein said camera is capable of gathering visual data regarding at least one variable of rig state and said processor is capable of compiling rig state data, estimating global rig state, or both. The system further comprises multiple sensors for measuring variables related to global rig state wherein said sensors are operably connected to said processor. The method comprises sensing various aspects of the rig state, collecting visual data corresponding with said sensor data, compiling multiple sources of rig data, and estimating the overall rig state.

28 Claims, 3 Drawing Sheets

(56) References Cited

U.S. PATENT DOCUMENTS

| | | |
|---|---|---|
| 7,933,166 B2 | 4/2011 | Goodman |
| 8,218,826 B2 | 7/2012 | Ciglenec et al. |
| 8,233,667 B2 | 7/2012 | Helgason et al. |
| 8,363,101 B2 | 1/2013 | Gschwendtner et al. |
| 8,395,661 B1 | 3/2013 | Olsson et al. |
| 8,547,428 B1 | 10/2013 | Olsson et al. |
| 8,622,128 B2 | 1/2014 | Hegeman |
| 8,812,236 B1 | 8/2014 | Freeman et al. |
| 8,873,806 B2 | 10/2014 | Kiest, Jr. |
| 9,041,794 B1 | 5/2015 | Olsson et al. |
| 9,134,255 B1 | 9/2015 | Olsson et al. |
| 9,279,319 B2 | 3/2016 | Savage |
| 9,410,877 B2 | 8/2016 | Maxey et al. |
| 9,464,492 B2 | 10/2016 | Austefjord et al. |
| 9,518,817 B2 | 12/2016 | Baba et al. |
| 9,651,468 B2 | 5/2017 | Rowe et al. |
| 9,664,011 B2 | 5/2017 | Kruspe et al. |
| 9,677,882 B2 | 6/2017 | Kiest, Jr. |
| 9,706,185 B2 | 7/2017 | Ellis |
| 9,869,145 B2 | 1/2018 | Jones et al. |
| 9,912,918 B2 | 3/2018 | Samuel |
| 9,915,112 B2 | 3/2018 | Geehan et al. |
| 10,227,859 B2 | 3/2019 | Richards et al. |
| 10,323,503 B2 | 6/2019 | Wendorf et al. |
| 10,328,503 B2 | 6/2019 | Osawa et al. |
| 10,997,412 B2 | 5/2021 | Torrione |
| 2004/0124009 A1* | 7/2004 | Hoteit ................ G06N 7/005 175/48 |
| 2004/0124012 A1* | 7/2004 | Dunlop ................ G06N 7/005 175/57 |
| 2008/0162085 A1* | 7/2008 | Clayton ............ G05B 23/0262 702/188 |
| 2009/0090555 A1 | 4/2009 | Boone et al. |
| 2009/0159294 A1 | 6/2009 | Abdollahi et al. |
| 2009/0225630 A1* | 9/2009 | Zheng ................ E21B 47/00 367/81 |
| 2009/0265110 A1* | 10/2009 | Narayanan ............ G01V 11/00 702/14 |
| 2010/0114493 A1 | 5/2010 | Vestal |
| 2012/0173218 A1* | 7/2012 | Shafer ................ E21B 44/00 703/7 |
| 2013/0076907 A1 | 3/2013 | Hobbs et al. |
| 2013/0236064 A1 | 9/2013 | Li et al. |
| 2013/0265409 A1 | 10/2013 | Tjhang et al. |
| 2013/0275100 A1 | 10/2013 | Ellis et al. |
| 2014/0002617 A1 | 1/2014 | Zhang et al. |
| 2014/0326505 A1 | 11/2014 | Davis et al. |
| 2014/0333754 A1 | 11/2014 | Graves et al. |
| 2014/0348385 A1 | 11/2014 | Kozicz et al. |
| 2015/0138337 A1 | 5/2015 | Tjhang et al. |
| 2015/0218936 A1 | 8/2015 | Maher et al. |
| 2016/0112678 A1* | 4/2016 | Suvanen ................ E21B 7/025 175/24 |
| 2016/0130917 A1* | 5/2016 | Torrione ................ E21B 41/00 348/85 |
| 2017/0089153 A1 | 3/2017 | Teodorescu |
| 2017/0161885 A1 | 6/2017 | Parmeshwar et al. |
| 2017/0167853 A1 | 6/2017 | Zheng et al. |
| 2017/0322086 A1 | 11/2017 | Luharuka et al. |
| 2018/0180524 A1 | 6/2018 | Francois et al. |
| 2019/0100988 A1 | 4/2019 | Ellis et al. |
| 2019/0102612 A1 | 4/2019 | Takemoto et al. |
| 2019/0136650 A1 | 5/2019 | Zheng et al. |
| 2019/0141294 A1 | 5/2019 | Thorn et al. |
| 2019/0206068 A1 | 7/2019 | Stark et al. |
| 2021/0209361 A1* | 7/2021 | Torrione ................ E21B 41/00 |
| 2021/0348507 A1* | 11/2021 | Holt ................ E21B 47/12 |
| 2022/0277250 A1* | 9/2022 | Akiode ................ E21B 41/00 |

FOREIGN PATENT DOCUMENTS

| | | |
|---|---|---|
| WO | 2016147045 A1 | 9/2016 |
| WO | 2017042677 A1 | 3/2017 |
| WO | 2017132297 A2 | 8/2017 |
| WO | 2017176689 A1 | 10/2017 |
| WO | 2018093273 A1 | 5/2018 |
| WO | 2018131485 A1 | 7/2018 |
| WO | 2018148832 A1 | 8/2018 |
| WO | 2018157513 A1 | 9/2018 |

OTHER PUBLICATIONS

U.S. Appl. No. 14/938,523, "Final Office Action", dated Dec. 21, 2017, 12 pages.
U.S. Appl. No. 14/938,523, "Non-Final Office Action", dated Jul. 27, 2017, 14 pages.
U.S. Appl. No. 14/938,523, "Notice of Allowance", dated Aug. 31, 2020, 7 pages.
U.S. Appl. No. 14/938,523, "Notice of Allowance", dated Dec. 23, 2020, 8 pages.
PCT/US2015/060186, "International Search Report and Written Opinion", dated Jan. 29, 2016, 6 pages.
Canadian Patent Application No. 2,967,773, "Office Action", dated Oct. 3, 2022, 6 pages.
Canadian Patent Application No. 2,967,773, "Office Action", dated Jun. 21, 2023, 5 pages.

* cited by examiner

SYSTEMS AND METHODS FOR ESTIMATING RIG STATE USING COMPUTER VISION

CROSS-REFERENCES TO RELATED APPLICATIONS

This application is a continuation of U.S. non-provisional application Ser. No. 14/938,523 filed Nov. 10, 2015, which claims the benefit of U.S. Provisional Application Ser. No. 62/078,587 filed Nov. 12, 2014. The entire disclosure of all these applications (including all attached documents) are incorporated by reference in their entireties for all purposes.

FIELD OF THE INVENTION

The invention relates to systems and methods for estimating rig states using computer vision for time and motion studies.

BACKGROUND AND SUMMARY

Modern drilling involves scores of people and multiple inter-connecting activities. Obtaining real-time information about ongoing operations is of paramount importance for safe, efficient drilling. As a result, modern rigs often have thousands of sensors actively measuring numerous parameters related to vessel operation, in addition to information about the down-hole drilling environment.

Despite the multitude of sensors on today's rigs, a significant portion of rig activities and sensing problems remain difficult to measure with classical instrumentation, and person-in-the-loop sensing is often utilized in place of automated sensing.

By applying automated, computer-based video interpretation, continuous, robust, and accurate assessment of many different phenomena can be achieved through pre-existing video data without requiring a person-in-the-loop. Automated interpretation of video data is known as computer vision, and recent advances in computer vision technologies have led to significantly improved performance across a wide range of video-based sensing tasks. Computer vision can be used to improve safety, reduce costs and improve efficiency.

There are hundreds of sensors on a modern drilling rig, each of which records detailed information about a very small part of the rig behavior—e.g., one sensor measures the flow in a pipe, another measures down-bore pressure, another measures pit volume. Making sense of all the data from each individual sensor is typically left to the rig operator, or, in some cases, to an automated (computerized) process that is responsible for alerting the user to unexpected measurements or well-behaviors (e.g., losses, influxes, stuck pipe, etc.).

Due to the complexity of modern drilling and the number of possible interacting human behaviors on a rig, aggregating data from each of these individual sensors is a very complicated task. Importantly, none of the individual sensors has direct access to the big-picture rig state. In other words, the large-scale activities occurring on the rig (e.g., adding barite to the pits, tripping, drilling ahead) are not readily deducible from each sensors readings in isolation, nor in aggregate.

Although not directly observable in the low-level sensor data, the rig-state is often obvious to the drilling engineer, who can visually survey the rig, and identify large-scale behaviors. For example, the rig operator could visually deduce that "we are pulling out of the rig, but currently the drill stand is in slips," or "someone is adding barite to the pits, and is doing so after the flow sensor, which will cause pit volume measurements and flow-out measurements to diverge, so I should pay attention to the flow-out measurements to identify possible influx or losses, but ignore changes in the pit volume for the time being." This level of visual information aggregation provides significant benefits to human-in-the-loop data processing, and also provides a level of information not currently easily available in post-drilling analyses.

Significant effort is often spent analyzing hours and days of video feeds from rigs to perform time & motion studies ("T&M studies"), which are typically focused on one or two classical "drilling states"—e.g., improving time spent pulling out of hole. Since raw video data is not annotated, it is extremely difficult to "jump" to the next instance of any particular state without having watched and annotated the whole video first; which is very time consuming and error-prone. It is also currently not possible to automatically determine, from the observed video and down-well data, the amount of time spent in any one state. However, these important T&M parameters could be automatically estimated if state data could be automatically inferred and added to the video data stream. Incorporation of this information could make all other rig automation and sensing technologies operate more smoothly and produce overall higher quality results.

Therefore there is a need for an automated computer vision based technique for observing and estimating large-scale information about the complete rig state. This will enable improved low-level processing by incorporating rig state into decision making, and enable improved T&M analyses and processing by providing automatically annotated video feeds for rig understanding.

Furthermore, the incorporation of computer vision technologies to estimate rig state enables automated identification of dangerous or uncommon states and state transitions. Alerts regarding uncommon scenarios may be presented to the user in plain-English descriptions of the observed state.

Finally, automated rig state detection also enables improved automated decision making and rig control.

BRIEF SUMMARY OF THE INVENTION

FIG. 1 depicts an example of classical well state transitions.

FIG. 2 shows one embodiment of a more detailed representation of the underlying rig state.

FIG. 3 depicts a low-level state-tracking as part of a larger state estimation process.

FIG. 4 shows one of many embodiments of the disclosed rig state estimation system utilizing multiple cameras.

FIG. 5 shows the steps of one of many methods for estimating rig state.

BRIEF DESCRIPTION OF THE DRAWINGS

The Rig State Estimation system, ("RSE"), may contain several parts including a model of rig state not as a single discrete "state" that can be entered and exited from, but as a collection of facts about a rig that may be estimated and updated in real-time. In addition to multiple sensors 120, which may provide information such as measured surface readings or down-well measurements, RSE uses computer vision and machine learning algorithms specifically designed to estimate the rig state from video cameras 102.

The resulting information about rig state may then be incorporated into a display, along with other relevant pieces of information (e.g., video frames) and the state information is used to improve algorithm performance by altering the relative importance of the variables under consideration and other algorithm-level modifications. The information may also be used to form T&M databases 112 and reports, and to annotate the collected video with relevant T&M information. This would allow, for example, someone to immediately jump to all the instances of "roughneck engaged" or "adding barite to the pits" in a video feed. The information can help identify and flag uncommon events, presenting information about these events to the end-user in plain English. It may also be used to automate and generally improve rig behaviors. As a result total rig performance may be significantly enhanced.

Classical estimates of rig "state" utilize a finite-set of discrete states corresponding to large-scale rig behavior, e.g., "Drilling", "Pulling Out Of Hole", "Out Of Hole", "Running Into Hole", etc. This is visualized in FIG. 1. While these kinds of state models are useful when the number of states is small and can be easily described, in reality, the "state" of a rig is determined by dozens of interacting activities and behaviors. Complete enumeration of all of the possible combinations of activities and learning the probabilities of transitioning between all the states is typically intractable.

Figures 1, 2:
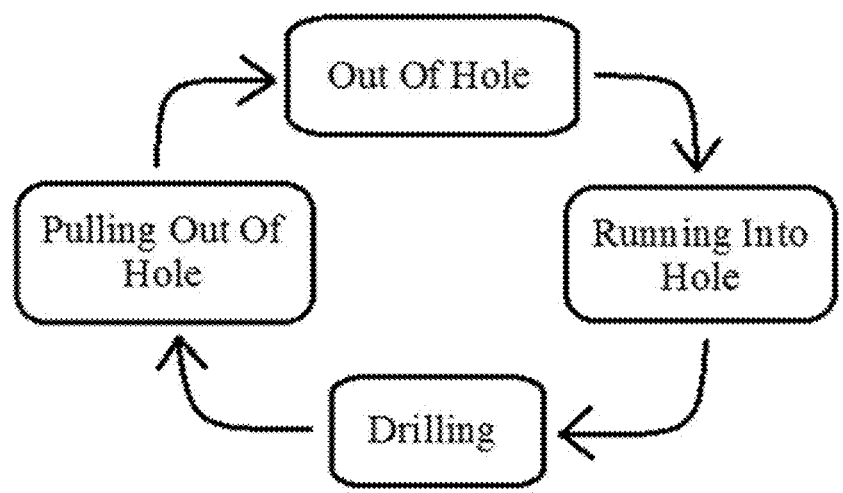

Instead, this invention makes use of an alternative conceptualization of "state" which is shown in FIG. 2. Here, each activity is represented as a column and time progresses from top to bottom. In this embodiment, each activity is represented as a binary variable (grouped binary variables are mutually exclusive, e.g., it is impossible to be drilling and pulling-out-of-hole simultaneously) which is updated at regular intervals (the intervals may be variable dependent, not shown). FIG. 2 shows a state evolution where the rig was initially drilling, then stopped to pull out of hole, and finally reached the state "out of hole." Meanwhile, the volume in the pits was varied as the pits were emptied, and barite was added to the pits on and off during pulling out of the hole. Also, the iron roughneck was engaged and disengaged several times during the process (to disconnect pipe stands, for example).

As shown in the embodiment of FIG. 2, the state may consist entirely of binary valued variables, but a state may also include discrete variables taking multiple possible values (e.g., the number of pipe-stands in the well), as well as real-valued states (e.g., hole depth).

Estimating rig state as a number of discrete variables has a number of benefits over classical state estimation and tracking, for example, to account for all the various rig behaviors in a classical system requires an exponentially increasing number of discrete states, and an even larger number of inter-state transition probabilities.

Depending on the state specification, different algorithms making use of different data sources are implemented to detect different relative variables. These algorithms use features from the relevant sensor data, together with machine learning algorithms for decision making. For example, to determine whether the rig is "pulling out of hole" an algorithm could utilize information from:
1. the recent changes in bit depth and current hole depth,
2. video of the pipe-stand, and pipe tracking outputs, and/or
3. recent or ongoing roughneck engaged/disengaged measures.

Information from each of these sensing modalities may be extracted using feature extraction approaches to generate low-dimensional, information bearing representations of the data. Low-level or quickly changing states that are likely to occur in a repeated sequence can be further aggregated into temporal models of likely behaviors within each larger state. For example, video observations of the rig floor during the "pulling out of hole" state are likely to iteratively determine three states in succession as depicted in FIG. 3.

Figure 3:
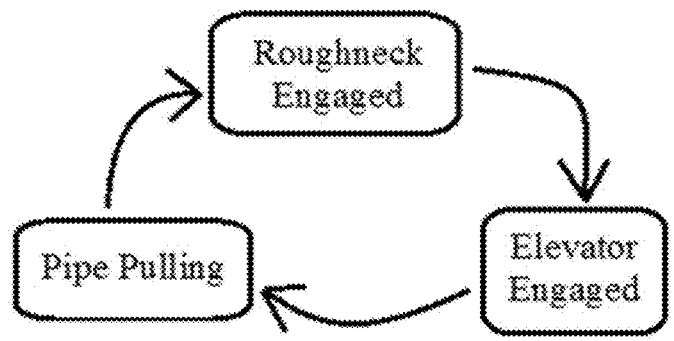

Explicit small-scale state-transition models, like the one shown in FIG. 3, are used to aggregate information temporally to improve evidence of the larger state inference (e.g., spending time in the activities shown in FIG. 3 adds credence to the "Pulling Out Of Hole" state).

Throughout processing, each video camera 102 may incorporate human detection and tracking processing to identify the locations of people on the rig, flag any important occlusions (e.g., someone is blocking the camera's view of the drill hole), and/or record a person's motion and activities. These activities may then be utilized in automated T&M reporting.

Information from the estimated rig state is also provided to systems for the identification of uncommon or dangerous state transitions and automated rig control systems (discussed below). Information about the global rig state may then be directly utilized in improving automated alarm generation systems. For example, information that there is barite added to the pits is used to change the influx detection system to ignore pit volume measurements for the time being. Similarly, information about the states "pipe static" and/or "pumps off" indicates that any positive change in flow-out and pit-volume may be highly indicative of downwell influx, since no other activities should be influencing those measurements.

In addition to altering real-time processing and generally improving rig operations, computer vision based rig state detection and personnel tracking may also be used to automatically annotate video data as it is collected, along with the rig state, number of persons in scene, and other relevant sensor information. This processing may automatically add additional information to be attached to the video stream, to enable fast searching for discrete events (e.g., "show me every instance where tripping out of hole took more than 20 minutes but hole depth was less than 2000 ft"), which is currently intractable and extremely time-consuming with existing software. Embodiments of the system may show a prototype state visualization tool and sample frames from each "pipe-pulled" event found in the video. Each of these frames may provide a direct link to the corresponding point in the video.

Each state-vector is recorded as a function of time and/or as part of a relational database (or other suitable software, e.g., a spreadsheet). These state-vector data sets are then used to automatically generate reports, and are made available to T&M analysts after data is collected. These data sets enable automatic searching over massive amounts of video that has been automatically tagged with T&M relevant information. For example, this enables identification of all events of type Y that took more than M minutes across all wells and rigs, using only already collected video and sensor data. This represents a large time savings and increase in the power and efficiency of T&M reporting.

Each camera 102 may also keep track of all people in the scene using automated person-detection algorithms. When multiple cameras are viewing the same region, person locations can be estimated and provided as part of the automated T&M reporting and database—e.g., "Person 1 detected at location (x1,y1), Person 2 detected at location (x2,y2)." Persons may be automatically anonymized by blurring of the pixels containing detected persons for privacy and reporting reasons.

Since the joint computer vision/down-well signal processing approaches described provides a state descriptor vector, which can be of very high dimension, estimating complete inter-state transition probabilities is intractable. However, by aggregating states into larger-picture states, or considering small sub-sets of states only (e.g., only the state descriptors shown in the left most group of FIG. 2) it is possible to accurately enumerate likely and dangerous transition probabilities by incorporating a priori expert information about realistic state transitions and state transitions that should be rare or impossible (e.g., a transition from "drilling" directly to "out of hole" most likely indicates a sensor failure or error, other transitions may indicate dangerous or environmentally unsafe behaviors or situations).

Information from the computer vision and additional sensor state estimation techniques may also be used to determine appropriate rig control actions and automate rig behaviors and other processes through a supervisory control and data acquisition ("SCADA") control system.

Figure 4:
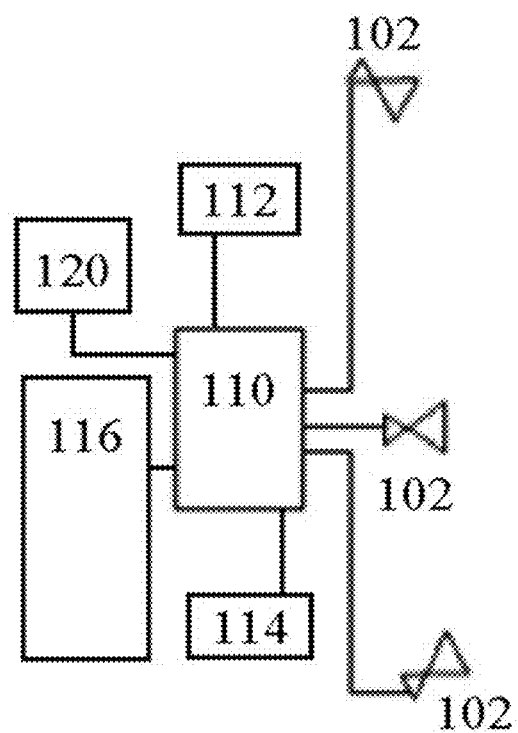

FIG. 4 shows one embodiment of the disclosed system in which multiple cameras 102 may be used to monitor various aspects of the rig state. The cameras 102 are operably connected to a processor 110. In this particular embodiment, the processor 110 is operably connected to a database 112, alarm 114, machinery control system 116 and sensor 120. In related embodiments one, some or all of these devices may be operably connected to the processor 110. Additionally, other embodiments may include, for example, multiple sensors 120.

Figure 5:
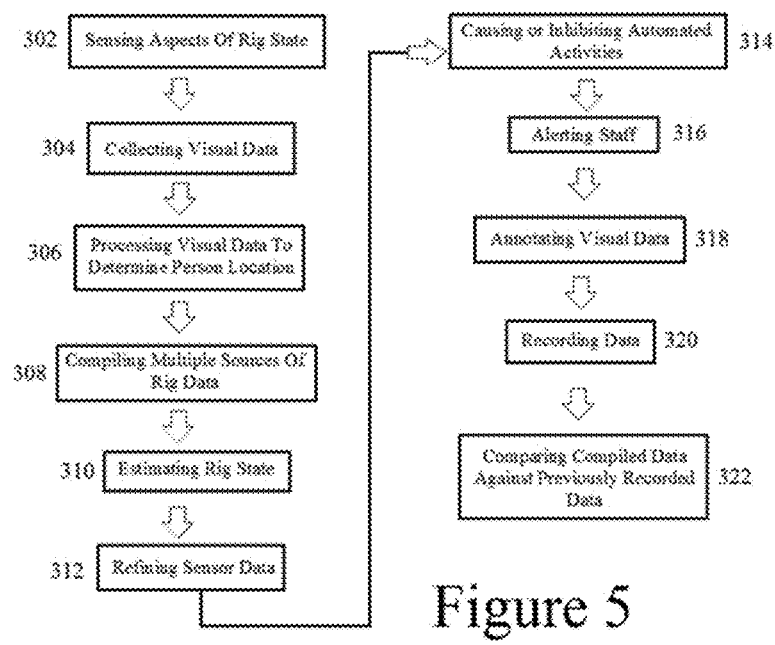

FIG. 5 shows the steps of a method for estimating rig state. The disclosed method comprises the steps of sensing aspects of rig state 302, collecting visual data, 304, processing visual data to determine person location 306, compiling multiple sources of rig data 308, estimating rig state 310, refining sensor data 312, causing or inhibiting automated activities 314, alerting staff 316, annotating visual data 318, recording data 320 and comparing compiled data against previously recorded data 322. Other embodiments may include some or all of these steps in any sequence.

Disclosed embodiments relate to a system for estimating global rig state. The system may include at least one camera 102 operably connected to at least one processor 110, wherein the camera is capable of gathering visual data regarding at least one variable of rig state. The processor 110 is also capable of compiling rig state data, estimating global rig state, or both. The system may also include at least one sensor 120 for measuring at least one variable related to global rig state wherein the sensor 120 is operably connected to the processor 110. The system may additionally include a model incorporating multiple variables related to rig state.

In certain embodiments, the model variables can be updated in real time, the compiled data may be displayed to a user, and/or the estimated rig state may be used to refine data collected from said sensors.

Some disclosed embodiments may also include a database 112 operably connected to the processor 110, wherein the processor 110 is capable of comparing current data against historical data in the database.

Additional embodiments may include an alarm system 114 for alerting staff to the occurrence of a pre-determined condition and/or a machinery control system 116 to cause or inhibit certain automated activities.

In some embodiments, the visual data, sensor 120 measurements, estimated rig state or any combination thereof are searchable by the processor 110.

Some disclosed embodiments relate to a method for estimating rig state. The method may comprise the steps of sensing at least one aspects of the rig state 302 using at least one sensor 120, collecting visual data 304 corresponding with the sensor data using at least one camera 102, compiling multiple sources of rig data 308 and estimating the overall rig state 310.

In certain embodiments, the estimated overall rig state may be used to refine the gathered sensor data 312 and/or the determined person location may be used to cause or inhibit certain automated activities 314.

Some embodiments may also include the steps of processing visual data to determine person location 306, alerting staff 316 to the occurrence of predetermined conditions, annotating gathered visual data 318 with corresponding rig state data, recording the compiled data 320 for future reference and/or comparing the compiled data against a database of previously recorded data 322.

What is claimed is:

1. A rig state estimation system, the system comprising:
   at least one processor;
   a memory coupled to the processor, wherein the memory comprises a plurality of instructions executable by the processor for:
      receiving information from a plurality of sensors associated with a drilling rig and associated equipment during drilling of a well by the drilling rig;
      receiving information from a camera configured to obtain visual images of a portion of the drilling rig or the associated equipment during drilling of the well;
      determining, responsive to the information from the plurality of sensors and the information from the camera, a state of the drilling rig or its associated equipment; and
      responsive to the determining of the state of the drilling rig or the associated equipment, determining an appropriate rig control response and sending a control signal to implement the rig control response.

2. The system according to claim 1, wherein the system further comprises a plurality of cameras, each coupled to the processor and each configured to obtain visual images of a portion of the drilling rig or associated equipment, and wherein the instructions comprise instructions for receiving information from the plurality of cameras.

3. The system according to claim 1, wherein the state of the drilling rig or its associated equipment comprises at least one of a drilling state, a pulling out of hole state, an out of hole state, a running into hole state, an adding barite state, an emptying pits state, a pumps on state, or a roughneck engaged state.

4. The system according to claim 3, wherein the instructions further comprise instructions for determining a plurality of states of the drilling rig or the associated equipment.

5. The system according to claim 1, wherein the instructions further comprise instructions for:
   responsive to the determining of the state of the drilling rig or the associated equipment, sending the control signal to a control system to cause or inhibit at least one activity of the drilling rig or the equipment as the rig control response.

6. The system according to claim 1, wherein the instructions further comprise instructions for:

responsive to the determining of the state of the drilling rig or the associated equipment, generating an alert as the rig control response.

7. The system according to claim 1, wherein the instructions further comprise instructions for:
responsive to the determining of the state of the drilling rig or the associated equipment, generating a report comprising the state of the drilling rig or the associated equipment as the rig control response.

8. The system according to claim 1, wherein the instructions further comprise instructions for:
responsive to the determining of the state of the drilling rig or the associated equipment, forming a database with historical data of the state of the drilling rig or the associated equipment as the rig control response.

9. The system according to claim 1, wherein the instructions further comprise instructions for:
assigning a plurality of rig states a group of binary variables, wherein each rig state of the plurality of rig states comprises an associated binary variable, and wherein the grouped binary variables are mutually exclusive; and
updating one of the binary variables based on the determined state of the drilling rig being the associated rig state of the plurality of rig states.

10. The system according to claim 1, wherein the instructions further comprise instructions for:
generating a video based on the information from the camera;
annotating the video with information from the plurality of sensors; and
storing the video in a database.

11. A computer vision system for estimating rig state of a drilling rig or associated equipment, the computer vision system comprising:
at least one processor;
at least one sensor operably connected to the at least one processor and configured to measure at least one parameter associated with the drilling rig and associated equipment during drilling of a well by the drilling rig; and
at least one camera operably connected to the at least one processor and configured to obtain visual images of a portion of the drilling rig or associated equipment during drilling of the well,
wherein the at least one processor is configured to:
receive information from the at least one sensor regarding the at least one parameter;
receive information from the at least one camera regarding the portion of the drilling rig or associated equipment;
determine, responsive to the information from the at least one sensor and the information from the at least one camera, a state of the drilling rig or its associated equipment;
refine the information from at least one of the plurality of sensors or the camera based on the determined state of the drilling rig or its associated equipment; and
determine an appropriate rig control response based on the determined state of the drilling rig and based on a comparison of the information from the at least one sensor and the information from the at least one camera against previously recorded data, and send a control signal to implement the rig control response.

12. The computer vision system of claim 11, wherein the at least one camera comprises a plurality of cameras, each operably coupled to the processor and each configured to obtain visual images of a portion of the drilling rig or associated equipment.

13. The computer vision system of claim 11, wherein the at least one sensor comprises a plurality of sensors, each operably coupled to the processor and each configured to measure at least one parameter associated with the drilling rig and associated equipment during drilling of the well by the drilling rig.

14. The computer vision system of claim 11, wherein the at least one processor is further configured to generate a report comprising the state of the drilling rig or the associated equipment as the rig control response.

15. A method of estimating rig state of a drilling rig or associated equipment, the method comprising:
receiving information from a plurality of sensors associated with the drilling rig and associated equipment during drilling of a well by the drilling rig;
receiving information from a camera configured to obtain visual images of a portion of the drilling rig or the associated equipment during drilling of the well;
determining, responsive to the information from the plurality of sensors and the information from the camera, a state of the drilling rig or its associated equipment; and
responsive to the determining of the state of the drilling rig or the associated equipment, determining an appropriate rig control action and sending a control signal to implement the rig control action.

16. The method according to claim 15, wherein determining the state or the drilling rig or its associated equipment comprises determining a plurality of states of the drilling rig or the associated equipment.

17. The method according to claim 15, wherein the state of the drilling rig or its associated equipment comprises at least one of a drilling state, a pulling out of hole state, an out of hole state, a running into hole state, an adding barite state, an emptying pits state, a pumps on state, or a roughneck engaged state.

18. The method according to claim 15, wherein sending the control signal comprises sending a control signal to a control system to cause or inhibit at least one activity of the drilling rig or the equipment.

19. The method according to claim 15, wherein sending the control signal comprises causing an alarm system to generate an alert.

20. The method according to claim 15, further comprising generating a report comprising the state of the drilling rig or the associated equipment.

21. The method according to claim 15, responsive to determining of the state of the drilling rig or the associated equipment, forming a database with historical data of the state of the drilling rig or the associated equipment.

22. The method according to claim 15, further comprising:
assigning a plurality of rig states a group of binary variables, wherein each rig state of the plurality of rig states comprises an associated binary variable, and wherein the grouped binary variables are mutually exclusive; and
updating one of the binary variables based on the determined state of the drilling rig being the associated rig state of the plurality of rig states.

23. The method according to claim 15, further comprising:
generating a video based on the information from the camera;

annotating the video with information from the plurality of sensors; and storing the video in a database.

24. A non-transient computer readable medium comprising program code that is executable by a processor to cause the processor to:

receive information from a plurality of sensors associated with a drilling rig and associated equipment during drilling of a well by the drilling rig;

receive information from a camera configured to obtain visual images of a portion of the drilling rig or the associated equipment during drilling of the well;

determine, responsive to the information from the plurality of sensors and the information from the camera, a state of the drilling rig or its associated equipment; and responsive to the determination of the state of the drilling rig or the associated equipment, determine an appropriate rig control action and sending a control signal to implement the rig control action.

25. The non-transient computer readable medium of claim 24, further comprising program code that is executable by a processor to cause the processor to:

assign a plurality of rig states a group of binary variables, wherein each rig state of the plurality of rig states comprises an associated binary variable, and wherein the grouped binary variables are mutually exclusive; and update one of the binary variables based on the determined state of the drilling rig being the associated rig state of the plurality of rig states.

26. The non-transient computer readable medium of claim 24, further comprising program code that is executable by a processor to cause the processor to:

generate a video based on the information from the camera;

annotate the video with information from the plurality of sensors; and store the video in a database.

27. The non-transient computer readable medium of claim 24, further comprising program code that is executable by a processor to cause the processor to determine a plurality of states of the drilling rig or the associated equipment based on the information from the camera and the information from the plurality of sensors.

28. The non-transient computer readable medium of claim 24, further comprising program code that is executable by a processor to cause the processor to:

generate a report comprising the state of the drilling rig or the associated equipment; and responsive to the determining of the state of the drilling rig or the associated equipment, form a database with historical data of the state of the drilling rig or the associated equipment.

* * * * *